United States Patent
Kirk et al.

(10) Patent No.: US 9,382,757 B1
(45) Date of Patent: Jul. 5, 2016

(54) BLIND PULL

(71) Applicants: James Kirk, Keller, TX (US); Barb Kirk, Keller, TX (US)

(72) Inventors: James Kirk, Keller, TX (US); Barb Kirk, Keller, TX (US)

(*) Notice: Subject to any disclaimer, the term of this patent is extended or adjusted under 35 U.S.C. 154(b) by 80 days.

(21) Appl. No.: 14/521,101

(22) Filed: Oct. 22, 2014

Related U.S. Application Data

(60) Provisional application No. 61/898,014, filed on Oct. 31, 2013.

(51) Int. Cl.
*E06B 9/324* (2006.01)
*E06B 9/38* (2006.01)
*F16G 11/10* (2006.01)
*E06B 9/326* (2006.01)
*F16G 11/04* (2006.01)

(52) U.S. Cl.
CPC . *E06B 9/38* (2013.01); *E06B 9/324* (2013.01); *E06B 9/326* (2013.01); *F16G 11/04* (2013.01); *F16G 11/106* (2013.01); *Y10T 24/3909* (2015.01); *Y10T 24/3969* (2015.01); *Y10T 24/3996* (2015.01)

(58) Field of Classification Search
CPC ............ Y10T 24/3996; Y10T 24/3909; Y10T 24/3969; E06B 9/326; E06B 9/324; E06B 9/325; F16G 11/04; F16G 11/106; A47H 11/00; A47H 11/02; A47H 11/04
USPC ....................................................... 160/178.2
See application file for complete search history.

(56) References Cited

U.S. PATENT DOCUMENTS

| | | | | |
|---|---|---|---|---|
| 4,615,532 A | * | 10/1986 | Biller | ...................... F16G 11/04 24/115 M |
| 8,595,905 B1 | * | 12/2013 | Kirk | ...................... A47H 11/04 160/178.1 R |
| 2005/0071958 A1 | * | 4/2005 | Toimil | .................... F16G 11/04 24/136 R |
| 2012/0141198 A1 | * | 6/2012 | Kondo | .................... F16G 11/02 403/361 |

* cited by examiner

*Primary Examiner* — Robert J Sandy
*Assistant Examiner* — Michael Lee
(74) *Attorney, Agent, or Firm* — Quickpatents, LLC; Kevin Prince

(57) ABSTRACT

A blind pull for a blind cord includes a pair of wedges that each has an inner side that includes a plurality of spikes for gripping the blind cord and an outer side that includes a plurality of detents. A wedge receiver has a front end, an internal wedge-shaped cavity for receiving the pair of wedges and the blind cord therein, and a rear end having at least one resilient hook adapted for engaging any of the detents of the wedges for retaining the wedges within the cavity. The cavity compresses the blind cord between the pair of wedges as the wedges are further inserted into the cavity. A pair of mating shells define a hollow cavity therein and are selectively fixable to each other with a mechanical fastener for securing around the wedges and wedge receiver, the shells being interchangeable and having an attractive, ornamental outside surface.

11 Claims, 4 Drawing Sheets

BLIND PULL

CROSS-REFERENCE TO RELATED APPLICATIONS

This application claims the benefit of U.S. Provisional Patent Application 61/898,014, filed on Oct. 31, 2013, and incorporated herein by reference.

STATEMENT REGARDING FEDERALLY SPONSORED RESEARCH AND DEVELOPMENT

Not Applicable.

FIELD OF THE INVENTION

This invention relates to window blinds, and more particularly to an improved blind pull.

DISCUSSION OF RELATED ART

Blind pulls for window blinds, such as vertical blinds, mini-blinds, or the like, commonly comprise a blind cord with a plastic cone fixed at the end thereof and secured by a knot in the blind cord. Such common blind pulls, while inexpensive, are bland, common, and provide no means of adding decorative features thereof. Further, such common blind pulls tend to be relatively light-weight and subject to considerably swaying in a breeze, for example, which is indicative of light-weight parts of low quality.

Therefore, there is a need for a device that efficiently adds weight to the blind pull, yet also allows the entire visible structure of the blind pull to be inexpensively and easily interchanged with alternate blind pulls of differing décor, themes, or the like, as desired. Such a needed invention would accommodate one or more blind cords of varying thicknesses, would be easy to install on existing blind cords, and would be relatively inexpensive to manufacture. The present invention accomplishes these objectives.

SUMMARY OF THE INVENTION

The present device is a blind pull for at least one blind cord. Window blinds typically have either one or more blind cords, and often the diameter of such blind cords varies with model or manufacturer. The blind pull of the present invention accommodates blind cords of a wide variety of diameters and number.

The blind pull includes a pair of rigid wedges that each has an inner side that includes a plurality of spikes for gripping the at least one blind cord, and an outer side that includes a plurality of detents. A wedge receiver has a front end with an aperture for receiving the at least one blind cord therethrough, an internal wedge-shaped cavity for receiving the pair of wedges and the at least one blind cord therein. The wedge receiver further includes a rear end having at least one resilient hook adapted for engaging any of the detents of the wedges for retaining the wedges within the cavity. The wedge-shaped cavity compresses the at least one blind cord between the pair of wedges as the wedges are further inserted into the cavity.

A pair of mating shells, when mutually mated together, define therein a hollow cavity for receiving the pair of wedges, wedge receiver and the at least one blind cord. The shells are selectively fixable to each other with a mechanical fastener, and may be interchangeable with a variety of ornamental designs on an outside surface thereof. The shells when mutually fixed together include an aperture therethrough for receiving the at least one blind cord.

In one embodiment, each shell includes a plastic or metal insert adapted for receiving the wedge receiver, the pair of wedges captured within the wedge receiver at any of the detents thereof, and the at least one blind cord. Each insert includes the mechanical fastener for selectively, mutually fixing each insert together. Further, each shell includes a weighted outer shell that is fixed with one of the inserts on an inside surface thereof. The weighted outer shell may be made from a metal casting process, for example, to provide weight to the blind pull.

Preferably the mechanical fastener is at least one pair of magnets, each outer shell includes a plurality of press-fit posts, and each insert includes a plurality of press-fit receivers. As such, each insert may be press-fit onto the outer shell and held thereon with friction. At least one post of the press-fit posts may be sized to accept one of the magnets between the post and the receiver of the insert, such that each insert and at least one magnet are fixed with one of the outer shells with friction. As such, the shells may be brought into mutual proximity to the point where the magnets mutually attract each other enough to secure the shells mutually together.

In use, with the at least one blind cord captured between the pair of wedges, and with the wedges and at least one blind cord inserted into the cavity of the wedge receiver until securely compressed, the mating shells may be selectively fixed about the at least one blind cord, wedges, and wedge receiver.

The present invention is a device that efficiently adds weight to the blind pull, yet also allows the entire visible structure of the blind pull to be inexpensively and easily interchanged with alternate blind pulls of differing décor, themes, or the like, as desired. The present device accommodates one or more blind cords of varying thicknesses, is easy to install on existing blind cords, and is relatively inexpensive to manufacture. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
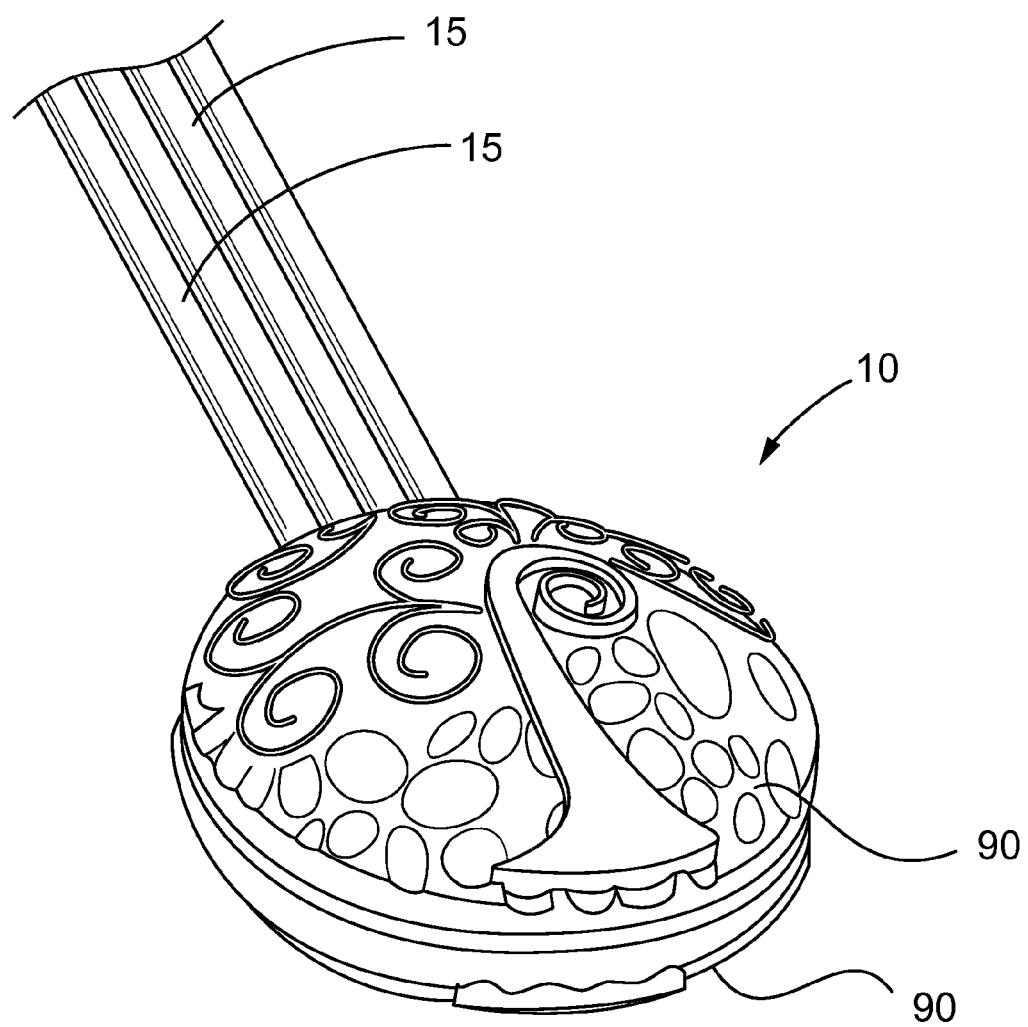
FIG. 1 is a perspective view of the invention, shown as assembled around four blind cords.
Figure 2:
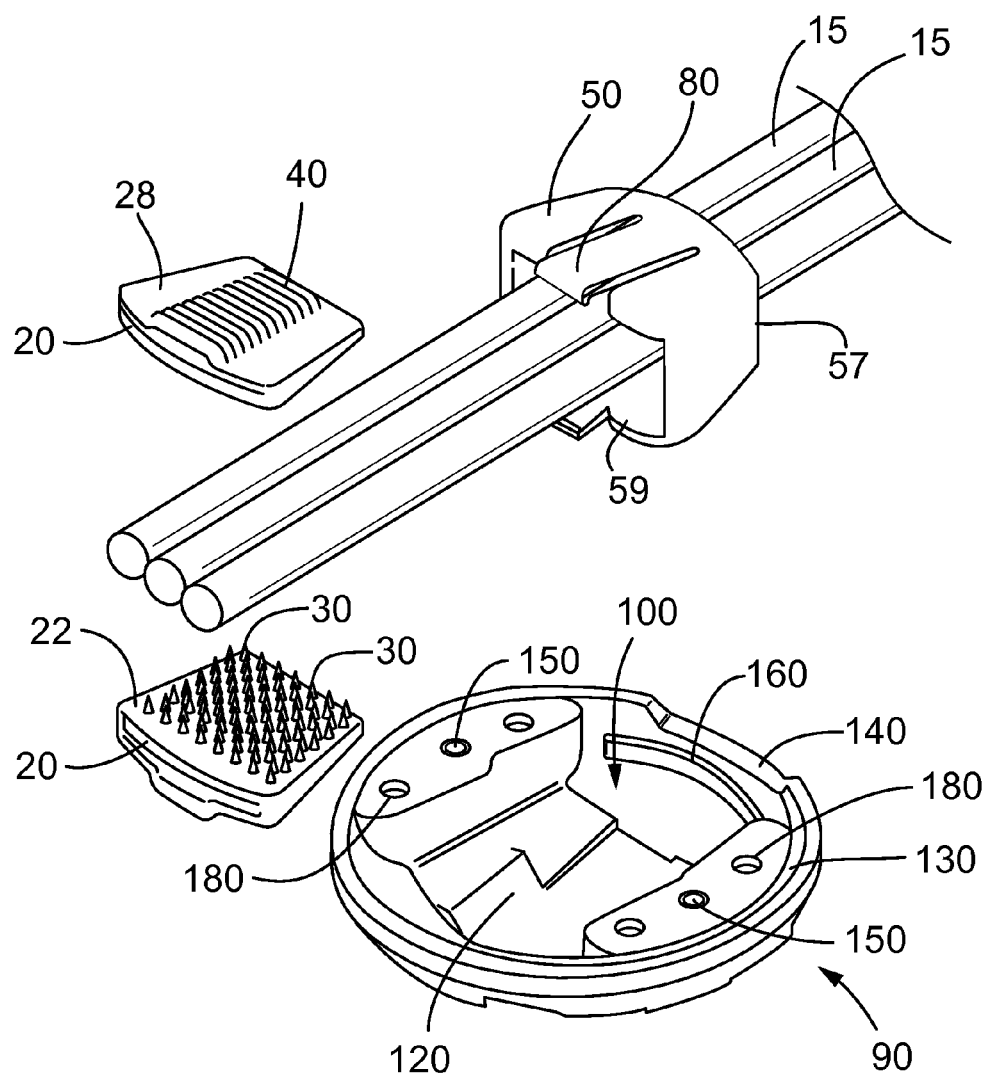
FIG. 2 is an exploded perspective view thereof, shown in use with three blind cords thicker in diameter than those of FIG. 1 and illustrated with one shell omitted for clarity of illustration.
Figure 3:
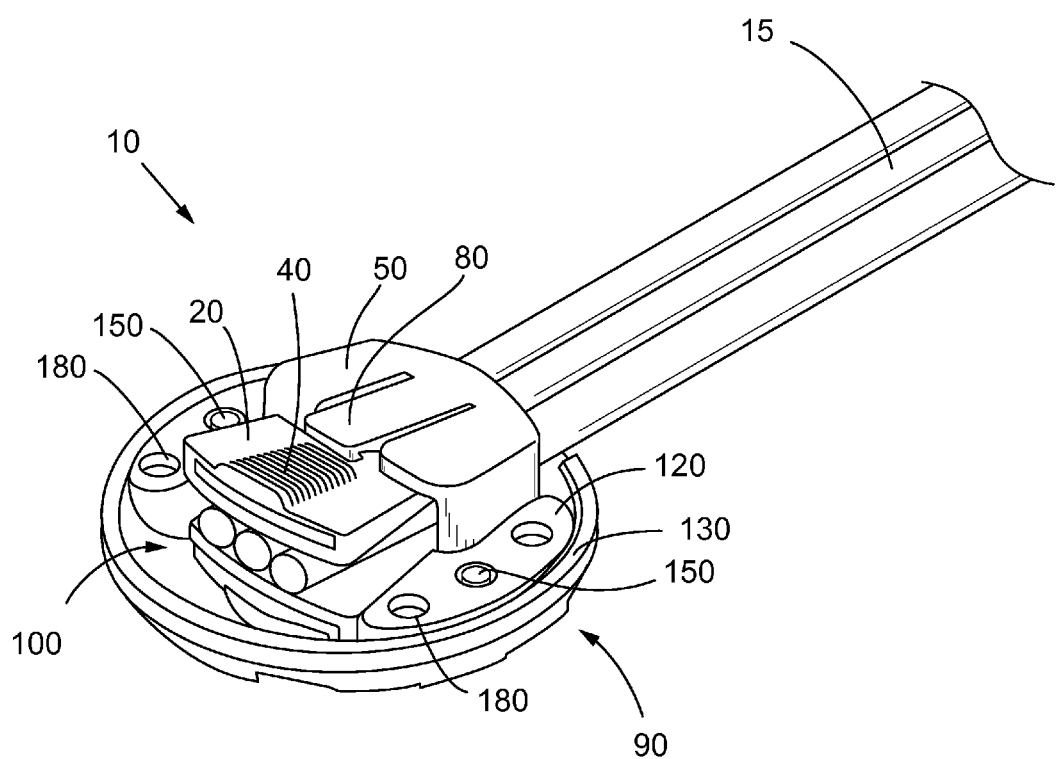
FIG. 3 is a perspective view of the invention, illustrated with one shell omitted for clarity of illustration.

FIGS. 1-3 illustrate a blind pull 10 for at least one blind cord 15. Window blinds typically have either one or more blind cords 15, and often the diameter of such blind cords 15 varies with model or manufacturer. The blind pull 10 of the present invention accommodates blind cords 15 of a wide variety of diameters and number.

Figure 4A:
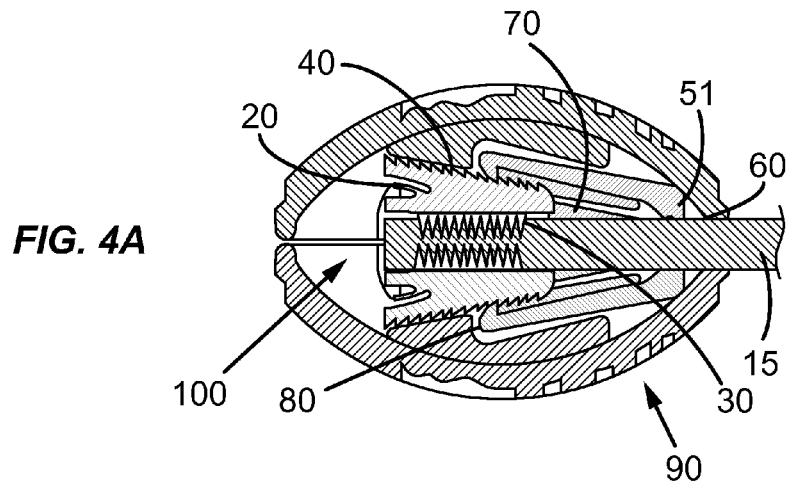
FIG. 4A is a cross-sectional view showing the invention as used with a relatively thick blind cord.
Figure 4B:
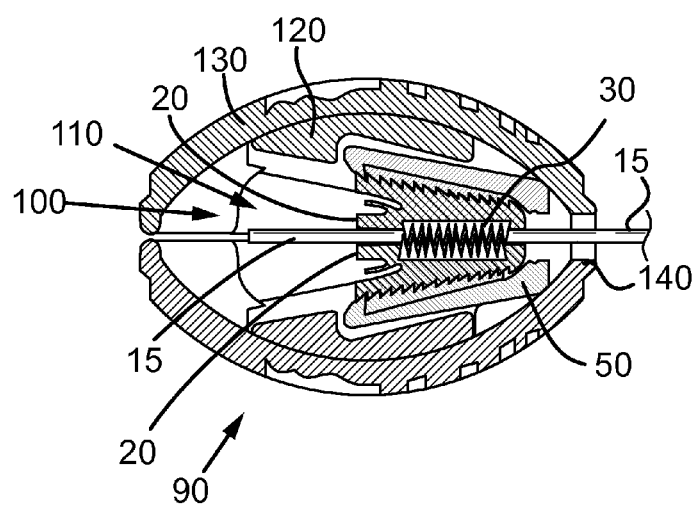
FIG. 4B is a cross-sectional view showing the invention as used with a relatively thin blind cord.

The blind pull 10 includes a pair of rigid wedges 20 that each has an inner side 22 that includes a plurality of spikes 30 for gripping the at least one blind cord 15, and an outer side 28 that includes a plurality of detents 40. Each wedge 20 is preferably identical, such that a single plastic injection mold may be used to produce both of the wedges 20 in the pair of wedges 20. As such, each spike 30 is longitudinally or laterally offset, such that the spikes 30 of each wedge 20 interlace with each other when opposing positioned (FIGS. 4A and 4B).

A wedge receiver 50 has a front end 51 with an aperture 60 for receiving the at least one blind cord 15 therethrough, an internal wedge-shaped cavity 70 for receiving the pair of wedges 20 and the at least one blind cord 15 therein, and a rear end 59 having at least one resilient hook 80 adapted for engaging any of the detents 40 of the wedges 20 for retaining the wedges 20 within the cavity 70. The wedge-shaped cavity 70 compresses the at least one blind cord 15 between the pair of wedges 20 as the wedges 20 are further inserted into the cavity 70. Preferably the wedge receiver 50 is made from a plastic material with an injection molding process, such that the hook 80 is resilient and the rest of the wedge receiver 50 is substantially rigid. To remove the at least one blind cord 15 from the wedge receiver 50, a tool (not shown) such as a screwdriver may be used to pry the resilient hook 80 away from the detents 40 of the wedges 20 to release the wedges 20 from the wedge receiver 50. The wedges 20 are then separated to remove the at least one blind cord 15.

Figure 5:
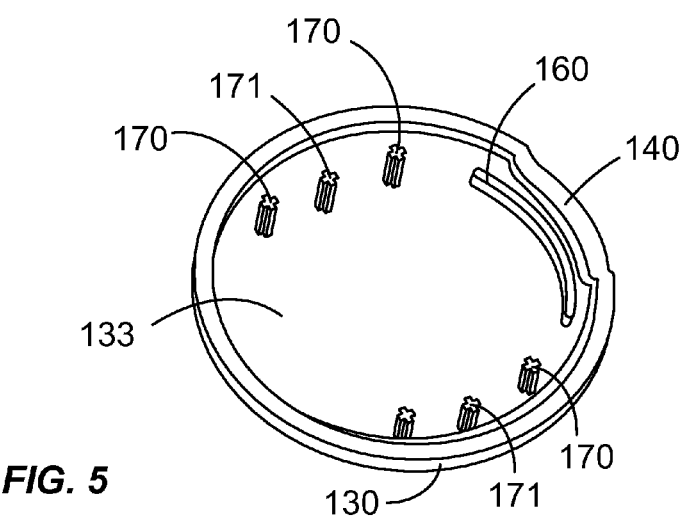
FIG. 5 is a perspective view of an embodiment having an outer shell.

A pair of mating shells 90, when mutually mated together, define therein a hollow cavity 100 for receiving the pair of wedges 20, wedge receiver 50 and the at least one blind cord 15 therein. The shells 90 are selectively fixable to each other with a mechanical fastener 110, and may be interchangeable with a variety of ornamental designs on an outside surface thereof. Preferably each shell 90 is substantially identical, such that a single mold may be utilized to produce each shell 90. The shells 90 when mutually fixed together include an aperture 140 therethrough for receiving the at least one blind cord 15. Each shell 90 preferably further includes a wedge receiver stop 160 adapted for contact the front end 51 of the wedge receiver 50 (FIG. 5). Preferably the hollow cavity 100 of each shell 90 is large enough and thereby adapted for receiving a length of the at least one blind cord 15 exiting from the rear end 59 of the wedge receiver 50 (FIG. 4B). In an embodiment wherein each shell 90 is made from a plastic injection molded material, an auxiliary weight (not shown) may be included to help add weight to the blind pull 10.

In one embodiment, each shell 90 includes a plastic or metal insert 120 (FIGS. 2, 3 and 4B) adapted for receiving the wedge receiver 50, the pair of wedges 20 captured within the wedge receiver 50 at any of the detents 40 thereof, and the at least one blind cord 15. Each insert 120 includes the mechanical fastener 110 for selectively, mutually fixing each insert 120 together. Further, each shell 90 includes a weighted outer shell 130 that is fixed with one of the inserts 120 on an inside surface 133 thereof. The weighted outer shell 130 may be made from a metal casting process, for example, to provide weight to the blind pull 10.

Preferably the mechanical fastener 110 is at least one pair of magnets 150, each outer shell 130 includes a plurality of press-fit posts 170 (FIG. 5), and each insert 120 includes a plurality of press-fit receivers 180. As such, each insert 120 may be press-fit onto the outer shell 130 and held thereon with friction. At least one post 171 of the press-fit posts 170 may be sized to accept one of the magnets 150 between the post 171 and the receiver 180 of the insert 120, such that each insert 120 and at least one magnet 150 are fixed with one of the outer shells 130 with friction. As such, the shells 90 may be brought into mutual proximity to the point where the magnets 150 mutually attract each other enough to secure the shells 90 mutually together (FIG. 1). Alternately, the mechanical fastener 110 may be a mechanical snap arrangement (not shown), a friction-fit arrangement (not shown), or a threaded screw arrangement (not shown).

In use, with the at least one blind cord 15 captured between the pair of wedges 20, and with the wedges 20 and at least one blind cord 15 inserted into the cavity 70 of the wedge receiver 50 until securely compressed, the mating shells 90 may be selectively fixed about the at least one blind cord 15, wedges 20, and wedge receiver 50.

While a particular form of the invention has been illustrated and described, it will be apparent that various modifications can be made without departing from the spirit and scope of the invention. For example, the pair of shells 90 are shown with a specific ornamental design in the drawings, but any suitable ornamental design could be applied to the outer surface of the shells 90. Further, the shells 90 could take any suitable shape, not just circular in plan view as shown. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A blind pull for at least one blind cord, comprising:
    a pair of wedges each having an inner side that includes a plurality of spikes for gripping the at least one blind cord, and an outer side that includes a plurality of detents;
    a wedge receiver having a front end with an aperture for receiving the at least one blind cord therethrough, an internal wedge-shaped cavity for receiving the pair of wedges and the at least one blind cord therein, and a rear end having at least one resilient hook adapted for engaging any of the detents of the wedges for retaining the wedges within the cavity, the wedge-shaped cavity compressing the at least one blind cord between the pair of wedges as the wedges are further inserted into the cavity;
    a pair of mating shells having a hollow cavity therein for receiving the pair of wedges, wedge receiver, and the at least one blind cord therein, the shells selectively fixable to each other with a mechanical fastener,
    whereby with the at least one blind cord captured between the pair of wedges, and with the wedges and blind cord inserted into the cavity of the wedge receiver until securely compressed, the mating shells may be selectively fixed about the at least one blind cord, wedges, and wedge receiver.

2. The blind pull of claim 1 wherein each wedge is substantially identical, and whereby each spike is longitudinally offset, such that a single mold may be utilized to produce each wedge, the spikes of each wedge interlaced when opposingly positioned.

3. The blind pull of claim 1 wherein each shell is substantially identical, whereby a single mold may be utilized to produce each shell.

4. The blind pull of claim 1 wherein each shell includes an insert adapted for receiving the wedge receiver, the pair of wedges captured within the wedge receiver at any of the detents thereof, and the at least one blind cord, each insert including the mechanical fastener for selectively, mutually fixing each insert, each shell further including a weighted outer shell each fixed with one of the inserts on an inside surface thereof, the shells when fixed mutually together including an aperture therethrough for receiving the at least one blind cord.

5. The blind pull of claim 1 wherein the mechanical fastener is at least one pair of magnets.

6. The blind pull of claim 4 wherein the mechanical fastener is at least one pair of magnets.

7. The blind pull of claim 1 wherein each shell includes a wedge receiver stop adapted for contacting the front end of the wedge receiver.

8. The blind pull of claim 4 wherein each outer shell includes a wedge receiver stop adapted for contacting the front end of the wedge receiver.

9. The blind pull of claim 1 wherein the hollow cavity of each shell is further adapted for receiving a length of the at least one blind cord exiting from the rear end of the wedge receiver.

10. The blind pull of claim 4 wherein each outer shell includes a plurality of press-fit posts and wherein each insert includes a plurality of press-fit receivers, whereby each insert may be press-fit onto the outer shell and held thereby with friction.

11. The blind pull of claim 10 wherein the mechanical fastener is at least one pair of magnets and wherein at least one of the posts of each outer shell is sized to accept one of the magnets between the post and the receiver of the insert, whereby each insert and at least one magnet are fixed with one of the outer shells with friction.

* * * * *